(12) United States Patent
Stümpert et al.

(10) Patent No.: US 10,887,797 B2
(45) Date of Patent: Jan. 5, 2021

(54) TRAFFIC SPLITTER FOR USER PLANE IN MOBILE NETWORKS

(71) Applicant: Telefonaktiebolaget LM Ericsson (publ), Stockholm (SE)

(72) Inventors: Martin Stümpert, Hochspeyer (DE); Stefan Behrens, Herzogenrath (DE); Georg Kunz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 116 days.

(21) Appl. No.: 16/314,778

(22) PCT Filed: Nov. 18, 2016

(86) PCT No.: PCT/EP2016/078186
§ 371 (c)(1),
(2) Date: Jan. 2, 2019

(87) PCT Pub. No.: WO2018/001538
PCT Pub. Date: Jan. 4, 2018

(65) Prior Publication Data
US 2019/0313286 A1 Oct. 10, 2019

(30) Foreign Application Priority Data
Jul. 1, 2016 (WO) ................. PCT/EP2016/065556

(51) Int. Cl.
*H04W 28/08* (2009.01)
*H04W 76/12* (2018.01)
(Continued)

(52) U.S. Cl.
CPC ......... *H04W 28/08* (2013.01); *H04L 29/0653* (2013.01); *H04L 41/042* (2013.01);
(Continued)

(58) Field of Classification Search
CPC ..... H04L 29/0653; H04L 69/22; H04L 45/00; H04L 41/12; H04L 41/042; H04L 45/64;
(Continued)

(56) References Cited

U.S. PATENT DOCUMENTS

2014/0153572 A1 6/2014 Hampel et al.
2014/0254373 A1* 9/2014 Varma .................. H04W 40/36
370/235

(Continued)

FOREIGN PATENT DOCUMENTS

WO WO 2015/010730 A1 1/2015
WO WO 2016/055097 A1 4/2016

OTHER PUBLICATIONS

International Search Report and Written Opinion of the International Searching Authority, PCT/EP2016/078186, dated Mar. 2, 2017, 12 pages.

(Continued)

Primary Examiner — Ashley Shivers
(74) Attorney, Agent, or Firm — Sage Patent Group (57) ABSTRACT

The application relates to a method for operating a traffic splitter provided for a data packet flow flowing through the data plane. The data packet flow is received and it is determined whether the data packet flow should be transmitted through an Evolved Packet Core, EPC, processing path or through a Software Defined Network, SDN, processing path based on information provided in the data packets of the data packet flow and it is transmitted either through the EPC processing path or the SDN processing path based on the determination.

20 Claims, 6 Drawing Sheets

(51) Int. Cl.

| | |
|---|---|
| *H04L 29/06* | (2006.01) |
| *H04L 12/701* | (2013.01) |
| *H04W 76/11* | (2018.01) |
| *H04L 12/715* | (2013.01) |
| *H04W 28/10* | (2009.01) |
| *H04L 12/24* | (2006.01) |

(52) U.S. Cl.
CPC .............. *H04L 41/12* (2013.01); *H04L 45/00* (2013.01); *H04L 45/64* (2013.01); *H04L 69/22* (2013.01); *H04W 28/10* (2013.01); *H04W 76/11* (2018.02); *H04W 76/12* (2018.02); *H04L 41/0806* (2013.01); *H04L 41/5054* (2013.01)

(58) Field of Classification Search
CPC . H04L 41/5054; H04L 41/0806; H04L 45/38; H04W 28/08; H04W 76/12; H04W 76/11; H04W 28/10
See application file for complete search history.

(56) References Cited

U.S. PATENT DOCUMENTS

| | | | |
|---|---|---|---|
| 2014/0341199 A1* | 11/2014 | Jeon .................... | H04L 67/2842 370/338 |
| 2017/0105144 A1* | 4/2017 | Strand ................... | H04W 16/18 |
| 2018/0376373 A1* | 12/2018 | Liao ...................... | H04W 28/08 |

OTHER PUBLICATIONS

Jose Costa-Requena, SDN integration in LTE mobile backhaul networks, Department of Communications and Networking, Aalto University, Finland, Feb. 10, 2014, XP032586981, pp. 264-269.

Kostas Pentikousis et al., MobileFlow: Toward Software-Defined Mobile Networks, Future Carrier Networks, IEEE Communications Magazine, IEEE Service Center, Piscataway, US, vol. 51, No. 7, Jul. 1, 2013, XP011519224, 10 Pages.

International Search Report and Written Opinion of the International Searching Authority, PCT/EP2016/065556, dated Mar. 2, 2017, 13 pages.

\* cited by examiner

TRAFFIC SPLITTER FOR USER PLANE IN MOBILE NETWORKS

CROSS REFERENCE TO RELATED APPLICATIONS

This application is a 35 U.S.C. § 371 national stage application of PCT International Application No. PCT/EP2016/078186 filed on Nov. 18, 2016, which in turns claims priority to PCT International Application No. PCT/EP2016/065556 filed on Jul. 1, 2016 the disclosures and content of which are incorporated by reference herein in their entirety.

TECHNICAL FIELD

The present application relates to a method for operating a traffic splitter and to the corresponding traffic splitter. Furthermore a computer program comprising program code and a carrier comprising the computer program is provided.

BACKGROUND

The $5^{th}$ generation of mobile communication networks (5G) targets new application scenarios such as industrial networking or the Internet-of-Things (IoT)—typically referred to as (critical) machine-type communication (MTC). MTC imposes fundamentally different requirements on the core network architecture than classic mobile broadband applications in 4G. Most notably, MTC requires ultra-low latency, high-bandwidth, and low cost to make deployments commercially viable.

The 3GPP packet core is a complex system supporting a multitude of features mainly aiming at mobile broadband, i.e. consumer devices. Much of the complexity of the packet core exists in order to support various forms of mobility between radio systems, network operator, and countries, as well as different forms of charging and enforcement of policies.

Today's Evolved Packet Core (EPC) architecture is designed to address the requirements of classic mobile broadband applications. Hence, functionality provided by the EPC includes, among others, charging of packet traffic, deep-packet inspection (DPI), and extensive support for device mobility. However, these features add to the overall complexity of the EPC architecture, but these are typically not needed in a MTC scenario. So a machine may not move at all after installation and may initiate only one application type of user plane traffic. The emerging Internet of Things and industrial applications create requirements that differ significantly from those created by mobile broadband consumer applications. While many use cases in the area of IOT benefit from (or even require) a wireless access, they seldom require handover between different radio technologies, international roaming, or real-time charging, to name only a few examples.

As a result of the feature richness, the classic EPC architecture is complex, causing considerable operational costs and is adding latency to the overall communication, which makes the EPC architecture less appropriate for MTC type of traffic. Consequently there is a clear need to find flexible solutions that allow to meet low latency requirements of particular EPC devices at low operational costs.

In parallel there is a trend towards programmable flow networking, appearing as part of Software Defined Networking (SDN), which aims at disaggregating network functions and making them accessible for applications. Many SDN solutions comprise an SDN controller that programs data plane nodes or software switches with appropriate flow handling instructions in order to perform the required packet manipulation and forwarding.

Furthermore, the bandwidth provided by 5G radio networks will increase significantly over existing 4G networks, resulting in a steep increase in traffic volume and resource utilization in the packet core. This demands efficient handling of large data volumes in the packet core.

On the other hand, there are also applications in the area of mobile broadband that require only simple functionality but need high bandwidth throughput. We refer to these as low-touch (LT) flows. In general, the user plane functionality in virtual packet core nodes executes on x86 CPU cores. Hence, network scalability is limited when high-bandwidth, low-touch flows occupy significant capacity in the virtual packet core user plane.

SUMMARY

There is a clear need for a solution that allows meeting low latency requirements of particular EPC subscribers.

According to a first aspect a method for operating a traffic splitter is provided, wherein the traffic splitter is provided for a data packet flow flowing through a data plane in a mobile communications network. According to one step of the method, the data packet flow is received and it is determined whether the data packet flow should be transmitted through an Evolved Packet Core (EPC) processing path or through a Software Defined Network (SDN) processing path based on information provided in the data packets of the data packet flow. Furthermore, the data packet flow is transmitted either through the EPC processing path or the SDN processing path based on the determination.

The traffic splitter added to the user plane of the data network allows isolating individual flows within one bearer or even mobile bearers in their entirety in order to have them handled by the SDN processing path or EPC processing path. When the SDN processing path is used, the flows can be offloaded from a processing path where a CPU intensive processing is carried out inside a physical or virtual network node. Normally, in the EPC processing path a more complex data manipulation is carried out on the data packet flow compared to a data manipulation carried out on the data packet flow in the SDN processing path. This means that in the SDN processing path a less complex data manipulation is carried out compared to the EPC processing path, but the processing is carried out with a higher efficiency and more options for optimizations, such as offloading of functions from a CPU to a dedicated hardware.

Furthermore, the corresponding traffic splitter provided for the data packet flow through the data plane is provided, wherein the traffic splitter comprises a memory and at least one processor, wherein the memory contains instructions executable by the at least one processor, wherein the traffic splitter is operative to carry out the steps mentioned above and mentioned in more detail below when the instructions are executed by the at least one processor.

Furthermore, a computer program comprising program code to be executed by the at least one processor of the traffic splitter is provided, wherein execution of the program code causes the at least one processor to execute the method mentioned above and discussed in more detail below. Furthermore, a carrier comprising the computer program is provided, wherein the carrier is one of an electronic signal, an optical signal, a radio signal or a computer readable storage medium.

It is to be understood that the features mentioned above and features yet to be explained below can be used not only in the respective combinations indicated, but also in other combinations or in isolation without departing from the scope of the present application. Features of the above-mentioned aspects and embodiments or described in detail below may be combined with each other in other embodiments, unless explicitly mentioned otherwise.

BRIEF DESCRIPTION OF THE DRAWINGS

The foregoing and additional features and effects of the application will become apparent from the following detailed description when read in conjunction with the accompanying drawings, in which like reference numerals refer to like elements.

DETAILED DESCRIPTION

In the following, embodiments will be described in detail with reference to the accompanying drawings. It is to be understood that the following description of embodiments is not to be taken in a limiting sense. The scope of the application is not intended to be limited by the embodiments described hereinafter or by the drawings which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components or physical or functional units shown in the drawings and described hereinafter may also be implemented by an indirect connection or coupling. A coupling between components may be established over a wired or wireless connection. Functional blocks may be implemented in hardware, software, firmware, or a combination thereof.

The present application provides a traffic splitter which is added into the user plane of a mobile communications network, be it a 4G or a 5G network. The traffic splitter allows isolating either mobile bearers in their entirety or individual flows within one bearer in order to have them handled by a high performance data plane with less complex data manipulations compared to the known EPC data plane flow processing. In the following, the data plane flows where a less complex data manipulation is carried out is also called a low-touch data plane which is different from the CPU intensive packet core user plane, also called high-touch user plane hereinafter. An example for a more complex data manipulation in the EPC processing path is deep packet inspection or real time charging for the data packet flow. An example of the less complex data manipulation carried out in the SDN processing path is forwarding a packet based on the destination address, such as the IP address or MAC address or a charging based on the amount of data (e.g. bytes) transferred.

In the following, a system, methods, nodes, and computer programs for splitting a user plane in a mobile communication network into an EPC processing path and an SDN processing path are described in more detail.

Within the context of the present application, the term "user equipment" (UE) refers to a device for instance used by a person (i.e. a user) for his or her personal communication. It can be a telephone type of device, for example a telephone or a Session Initiating Protocol (SIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

Within the context of the present application, the term "mobile communication network" or short "network" may particularly denote a collection of nodes or entities, related transport links, and associated management needed for running a service, for example a telephony service, Internet access service, or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, 4G, LTE, WLAN, Wi-Fi, 5G), mobile backhaul network, or core network such as IMS (IP Multimedia System), CS (Circuit Switched) Core, PS (Packet Switched) Core or Evolved Packet Core (EPC).

Within the context of the present application, the term "controller" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC (Mobile Switching Center), MME (Mobility Management Entity), SGSN (Serving Gateway Support Node), or the controlling entity of an SDN network segment.

Within the context of the present application, the term "subscriber database" refers to a database run by the network operator to store the information related to the subscribers of a network run by the operator. A subscriber database can be for example a HLR (Home Location Register), or a VLR (Visited Location Register), or a HSS (Home Subscriber Server), or a combination of HLR and HSS. A subscriber database may also be internally structured into a front end part handling the signaling with the other network nodes of the communication network and a generic database for storage of the data according to data layered architecture principles.

Within the context of the present application, the term "EPC control plane" refers to the controlling elements of a EPC, for example a MME.

An SDN controller manages network devices in an SDN system/segment. The network devices may be simple switches, realized either as physical switches or as virtual switches (vSwitch) implemented in pure software. The devices are also known as Data Processing Node (DPN) or as softswitch.

SDN allows the processes of packet forwarding on the one hand and forwarding control on the other hand to be logically separated. Packets are forwarded on the so-called data plane, while forwarding control happens on the so-called control plane.

Conventional network switches are configured so that packet forwarding on the data plane and forwarding control on the control plane take place within the same physical device. To overcome the technical limitations resulting therefrom, SDN has been introduced. SDN decouples the data plane from the control plane. While the data plane is still implemented in the switch itself, the control plane is implemented as software in a separate SDN controller that configures the forwarding states on the data plane. Based on these states, forwarding decisions are taken. For this reason the SDN controllers need no longer be co-located with the switches in a single physical device, and a single SDN controller can control multiple switches.

The SDN architecture comprises an SDN controller, which implements southbound APIs (Application Programming Interface) and northbound APIs. The SDN controller implements the "brains" of the network. So SDN controllers offer a centralized view of the overall network, and enable network administrators to dictate to the underlying systems (like switches and routers) how the forwarding plane should handle network traffic.

The SDN controller uses southbound APIs to relay information to the switches and routers "below". Openflow (OF), considered the first standard in SDN, was the original southbound API and remains as one of the most common protocols. Despite some considering OF and SDN to be one and the same, OF is merely one piece of the bigger SDN landscape. The SDN controller uses northbound APIs to communicate with applications and business logic "above". These help network administrators to programmatically shape traffic and deploy services in a quick and agile manner.

OF is a communication protocol that can be used to define packet forwarding in an SDN environment. OF enables an external SDN controller to configure a forwarding path through one or multiple OF switches. An OF switch therefore will be configured in accordance with the OF protocol or will be compatible therewith.

Each OF switch comprises one or more flow tables for packet ingress processing (e.g., lookup operations) and a group table for packet egress processing (e.g., forwarding operations). A communication channel stretches from each OF switch to each external SDN controller for communication based on the OF protocol. Using the OF protocol, the SDN controller can add, update and delete flow entries in the flow tables. Moreover, the SDN controller can control actions to be performed on the packets via the group table. Such control actions include forwarding control.

An OF switch is coupled to other network components (including other OF switches) via OF ports. An OF port is a network interface for passing packets between OF processing in the OF switch and the other network components. The OF switch receives packets on an ingress port. Each received packet keeps its ingress port as a property during packet ingress processing. As such, the ingress port can be used for flow table lookup operations and thus for packet forwarding control (also referred to as flow control herein). As an example, the ingress port of a packet can be used to direct that packet to an associated output port upon egress processing.

Now turning to the figures.

Figure 1:
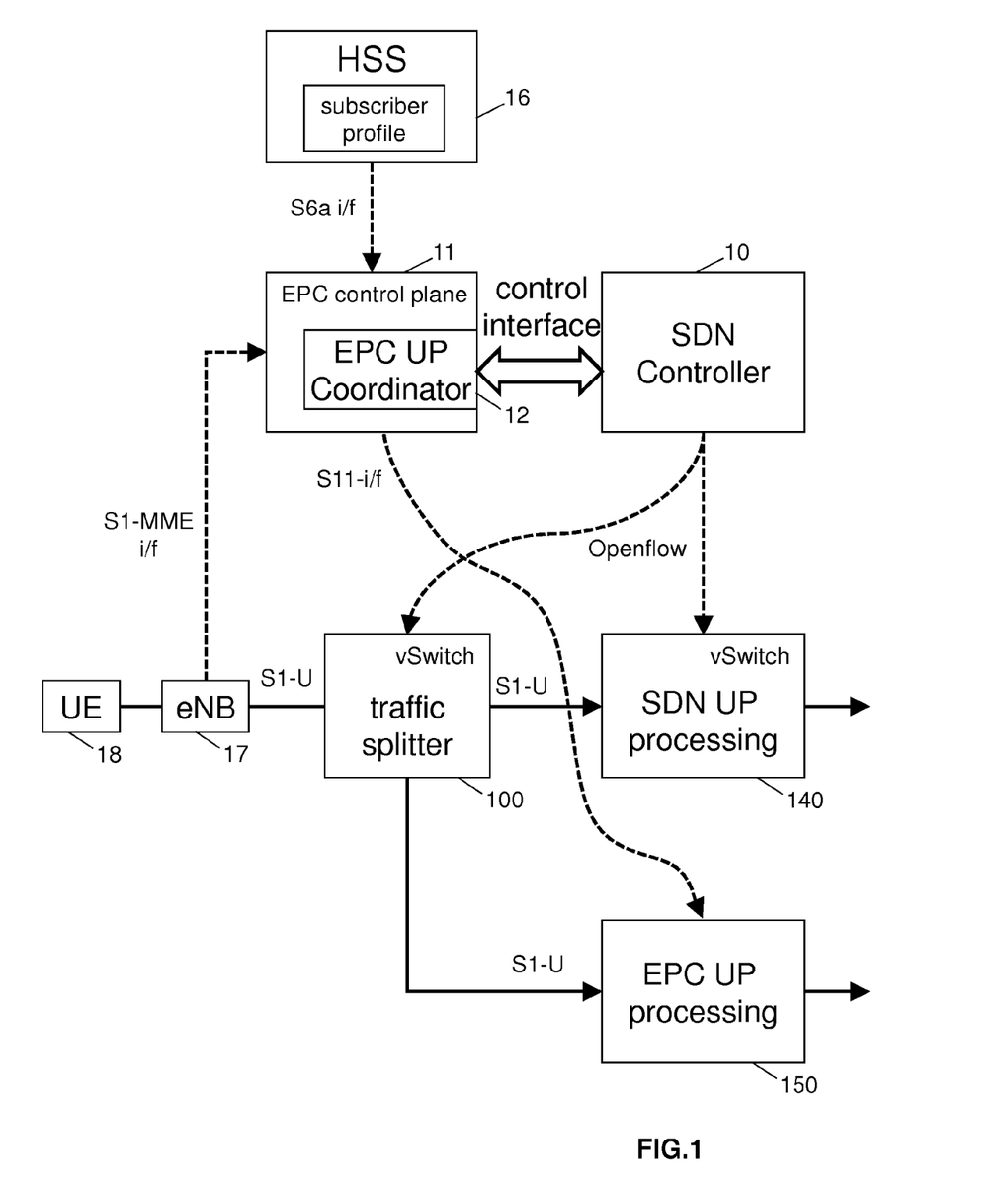
FIG. 1 shows a diagram illustrating a system for splitting a user plane in a mobile communications network into an EPC processing path and an SDN processing path.

Referring to FIG. 1, this figure shows a diagram illustrating a system for handling for splitting a user plane in a mobile communication network into an EPC processing path and an SDN processing path.

This concept enables the EPC to instruct the SDN controller 10 to handle user plane traffic of a UE 18 either in the SDN processing path 140 or to direct user plane traffic of a UE 18 to the EPC processing path 150. User plane traffic comprises uplink traffic, so from the UE 18 to the network, and as well downlink traffic, so from the network to the UE 18. So it allows for splitting the user plane in a mobile communication network into an EPC processing path 150 and an SDN processing path 140. The user traffic (control plane traffic and user plane traffic) is originating from the UE 18 (for uplink) and is terminating at the UE 18 (for downlink). The traffic is routed to a eNodeB (eNB) 17, being part of a radio access network.

The eNB 17 splits up the control signaling from the incoming user traffic and directs it to the EPC control plane 11 via a so called S1-MME interface. Inside the EPC control plane 11 there may be an MME node taking care of such S1-MME signaling. Control signaling from the EPC control plane 11 (e.g. from the MME) is directed to the eNB 17, which then forwards it to the UE 18.

The remaining user plane traffic from the UE 18 is directed to the user plane functions. Traditionally, such user plane traffic is routed to the EPC serving gateway (S-GW) and via the EPC packet gateway (P-GW) to the destination. This allows using all available EPC features, however, at the expense of latency and management complexity, and CPU load. Therefore in this concept the UE user plane is routed first to a traffic splitter 100, which is configured to route the UE user plane either along the EPC processing path 150 or the SDN processing path 140.

This traffic splitter 100 may be a separate entity in the network, or may be co-located or integrated into the transport infrastructure such as routers and switches, which support to be configured via SDN mechanisms. The traffic splitter 100 may be implemented in hardware, software or as a combination of hardware and software functions. The software components can be executed as part of the infrastructure or as virtual network function. A key feature of the traffic splitter 100 is that it can be programmed via an SDN control protocol such as Openflow or ForCES (Forwarding and Control Element Separation, IETF). In this way the SDN controller 10 can steer the traffic splitter 100 to route the UE user plane either along the EPC processing path 150 or the SDN processing path 140.

It is to be noted that the granularity of the splitting of user plane may be on flow level, wherein such a flow is defined by a particular combination of data packet information fields. So the traffic splitter 100 may be configured to route user plane of a number of UEs (e.g. having the same subscription or the same traffic type) as a whole, by alternative for all the user plane of a particular UE, or a particular subscriber, or even down to a particular service being used per UE 18. The traffic splitter 100 may also apply splitting on application level, so across a number of different UEs or subscribers. So the traffic splitter 100 may apply on any flow level detail as defined by the SDN controller 10.

So the traffic splitter 100 routes the UE user plane either along the EPC processing path 150 or the SDN processing path 140. The EPC processing path 150 is controlled by the EPC control plane 11 and the SDN processing path 140 is controlled by the SDN controller 10. The EPC processing path 150 would typically comprise the S-GW and P-GW of the traditional EPC, as described above.

The SDN processing path 140 may comprise simple user plane tasks such as user plane packet reformatting, re-framing, encapsulation, de-capsulation, or other simple user plane manipulations. In a particular embodiment, the SDN processing path 140 may be configured by the SDN controller 10 to remove/add the GTP (GPRS Tunnel Protocol) tunnel from/to the user plane. The SDN processing path 140 is controlled by the SDN controller 10 via an SDN control protocol such as Openflow or ForCES.

After having passed the EPC processing path 150 or the SDN processing path 140, the UE user plane traffic is routed to the destination.

The SDN controller 10 is coupled via a controlling interface to the EPC user plane coordinator 12. The user plane coordinator 12 may implement the user plane coordination function. This controlling interface may be a signaling interface where the EPC user plane coordinator 12 send signals or messages to the SDN controller 10 e.g. comprising instruction from the EPC user plane coordinator 12 the SDN controller 10 and associated data. The controlling interface may also be formed as an API where the EPC user plane coordinator 12 calls corresponding function of the SDN controller 10.

The EPC user plane coordinator 12 may be a stand-alone function residing on a separate network entity, or may be a virtual network function hosted on a virtual network function infrastructure. It may also be part of the EPC control plane 11, either as a co-located function/entity within the EPC control plane 11 or even as function integrated into existing nodes such as a MME.

The EPC control plane 11 comprises also known interfaces to a subscriber database, for example a HSS 16. The HSS 16 comprises subscriber related data, for example a subscriber profile for each subscriber having a subscription with the network operator. The subscriber profile may comprise statically configured data on services that the subscriber may use (e.g. subscriptions) or a classification of the subscriber into traffic classes. For example, the subscriber profile may identify the device to be a sensor or a surveillance camera.

In order to perform the traffic splitting, the EPC control plane 11 causes the EPC user plane coordinator 12 to determine whether to apply the EPC processing path 150 or the SDN processing path 140 to a UE user plane. This can for example be done by retrieving appropriate subscription information from the subscriber profile in the HSS 16. The network operator may mark subscriptions in the HSS 16 with a particular process path, either the EPC processing path 150 or the SDN processing path 140, shall be applied to that subscription. For example, a simple sensor could be marked as SDN processing path 140 user (for low latency), while a smart phone UE of an employee could be marked as EPC processing path 150 user. This allows to have both type of subscriptions handled within the same packet network.

In the next step the EPC user plane coordinator 12 causes, via the controlling interface, the SDN controller 10 to route the UE user plane in accordance with a result of the determination, so taking the determined processing path. This could be done by the EPC user plane coordinator 12 sending an appropriate instruction, signal or message, comprising corresponding data, to apply either the EPC processing path 150 or the SDN processing path 140, to the SDN controller 10. The SDN controller 10 could then select and program a traffic splitter 100 and an SDN processing path 140 accordingly.

The method of splitting the user plane into an EPC processing path 150 and an SDN processing path 140 may be triggered for example if the EPC control plane 11 receives an attachment request from a UE 18. Responsive to such attachment request received from the UE 18, the EPC control plane 11 may cause the EPC user plane coordinator 12 to determine whether to apply the EPC processing path or the SDN processing path to a UE user plane. As described above, such determination may then be based on a subscriber profile in the HSS 16 related to a subscriber using the UE 18. The determination may in this case be based on a traffic type indicator in the subscriber profile indicating a type of user plane demands of the UE. So the user plane demands may for example indicate that the UE 18 is a sensor and the related user plane demands could indicate a low latency requirement. By alternative, the user plane demands may for example indicate that the UE 18 is a smartphone, and a feature rich user plane treatment is required.

By alternative, the method of splitting the user plane into an EPC processing path 150 and an SDN processing path 140 may be triggered responsive to a traffic classification applied in the EPC processing path 150. The EPC processing path 150 may perform a dynamic classification of the user plane traffic received from a UE 18 or sent towards that UE 18. In this case the EPC control plane 11 may cause the EPC user plane coordinator 12 to determine whether to apply the EPC processing path 150 or the SDN processing path 140 to a UE user plane responsive to such traffic classification applied in the EPC processing path.

Such traffic classification applied in the EPC processing path 150 may for example be based on a deep packet inspection technique. In this case the flow of the user plane packets is analyzed and classified against typical traffic patterns (uplink and/or downlink). Such classification into typical traffic patterns could be used as an indication which application is used by the user, and a special treatment could then be applied to such user plane traffic stream. Such traffic classification applied in the EPC processing path 150 may be performed after attach of the UE 18 to the mobile communication network, so right in the beginning when the UE user plane starts. Such traffic classification may also be done periodically, so at fixed intervals starting from attach of the UE 18 to the mobile communication network. Such traffic classification may also be applied in the SDN processing path 140, resulting into a change of the routing of the user plane to the EPC processing path 150.

As described above, the EPC user plane coordinator 12 may be located within the EPC control plane 11, or may be a stand-alone entity, an own virtual network function, or may even be integral part of a MME entity.

In an alternative implementation, the traffic splitter 100 and the SDN controlled processing path 140 may be combined in a single SDN data plane node, for example in a common virtual switch entity. This combined entity may still comprise two independent controlling interfaces for configuring the traffic splitter and the processing path. The user plane would then internally inside the processing path forwarded between the traffic splitter and the processing path. By alternative, the combined entity may comprise a single, combined, controlling interface for configuring both, the traffic splitter and the processing path. This could be done by programming these functions into separate, concatenated, Openflow forwarding tables.

After having received an appropriate instruction via the controlling interface the SDN controller 10 routes the UE user plane in accordance with the result of the determination by configuring a traffic splitter 100 accordingly.

Now looking at the controlling interface in further detail. The controlling interface may comprise instructions from the EPC user plane coordinator 12 to the SDN controller 10 whether to apply the EPC processing path 150 or the SDN processing path 140 for a given UE user plane. This may be done by providing a corresponding routing instruction for routing the UE user plane. The UE user plane may be identified by providing corresponding address information of the UE user plane, for example an IP address or a packet tunnel identifier, e.g. a GTP tunnel identifier.

The controlling interface may also comprise information from the EPC user plane coordinator 12 to the SDN controller 10 on how to address the EPC processing path 150. Since the EPC control plane 11 is in charge of setting up the EPC processing path 150, the SDN controller 10 may receive information on how to route the UE user plane from the traffic splitter 100 to the individual EPC processing path 150. That addressing information may be a IP address complemented with IP port information of the received at the EPC processing path 150, or a GTP tunnel identifier.

Furthermore, the controlling interface may comprise information from the EPC user plane coordinator 12 to the SDN controller 10 on what processing to apply on the SDN processing path 140. So the SDN processing path 140 may also be determined by information in the subscriber profile. In this case also an indication on the kind of SDN processing path 140 to be applied may be given via the controlling interface.

Figure 2:
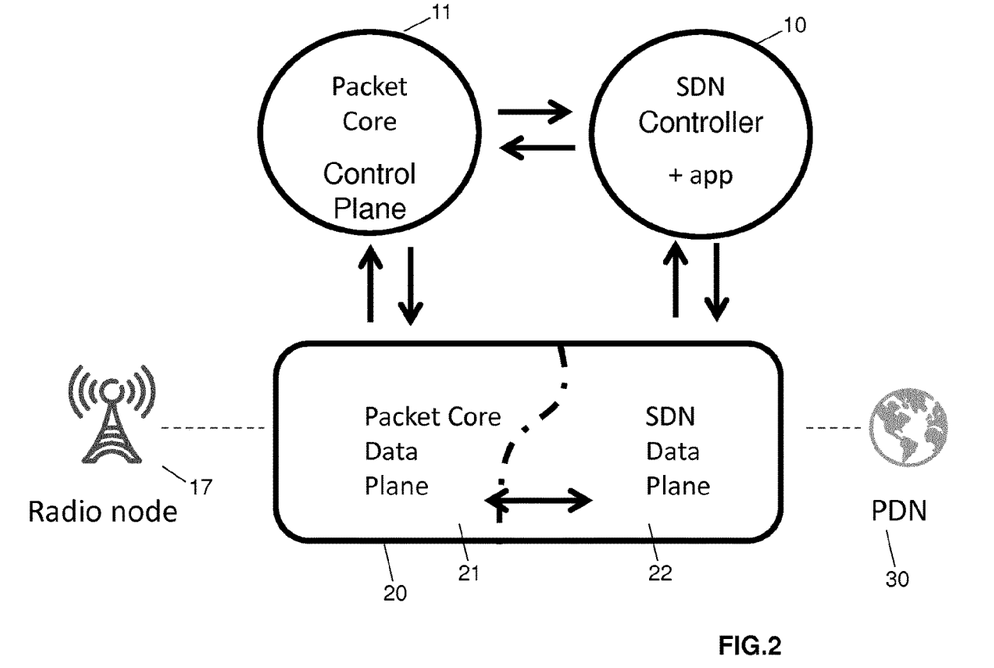
FIG. 2 shows a schematic view of a high-level architecture in which a data plane is either transmitted through the SDN processing path or the EPC processing path, each of the different paths being controlled by different entities.

FIG. 2 shows a high-level network architecture, especially of the data plane after implementation of the traffic splitter. The data plane 20 is divided into a packet core data plane 21 and the SDN data plane 22. Accordingly, a data plane traffic from the radio node 17 (e.g. eNB) to the packet data network (PDN) 30 or vice versa is either passed through the packet core data plane 21 or the SDN data plane 22. A packet core control plane 11 and the SDN controller 10 are provided, wherein the SDN controller 10 comprises the newly added application which is used to implement the functionalities of the SDN controller 10 discussed below or discussed above in connection with FIG. 1. The packet core control plane 11 and the SDN controller 10 interact through signaling messages and the packet core data plane 21 and the SDN data plane coexist with a flexible composition between them as required by individual use cases. A flow programming from the SDN controller 10 ensures that packets are subject to forwarding treatment individually per flow or per bearer.

Figure 3:
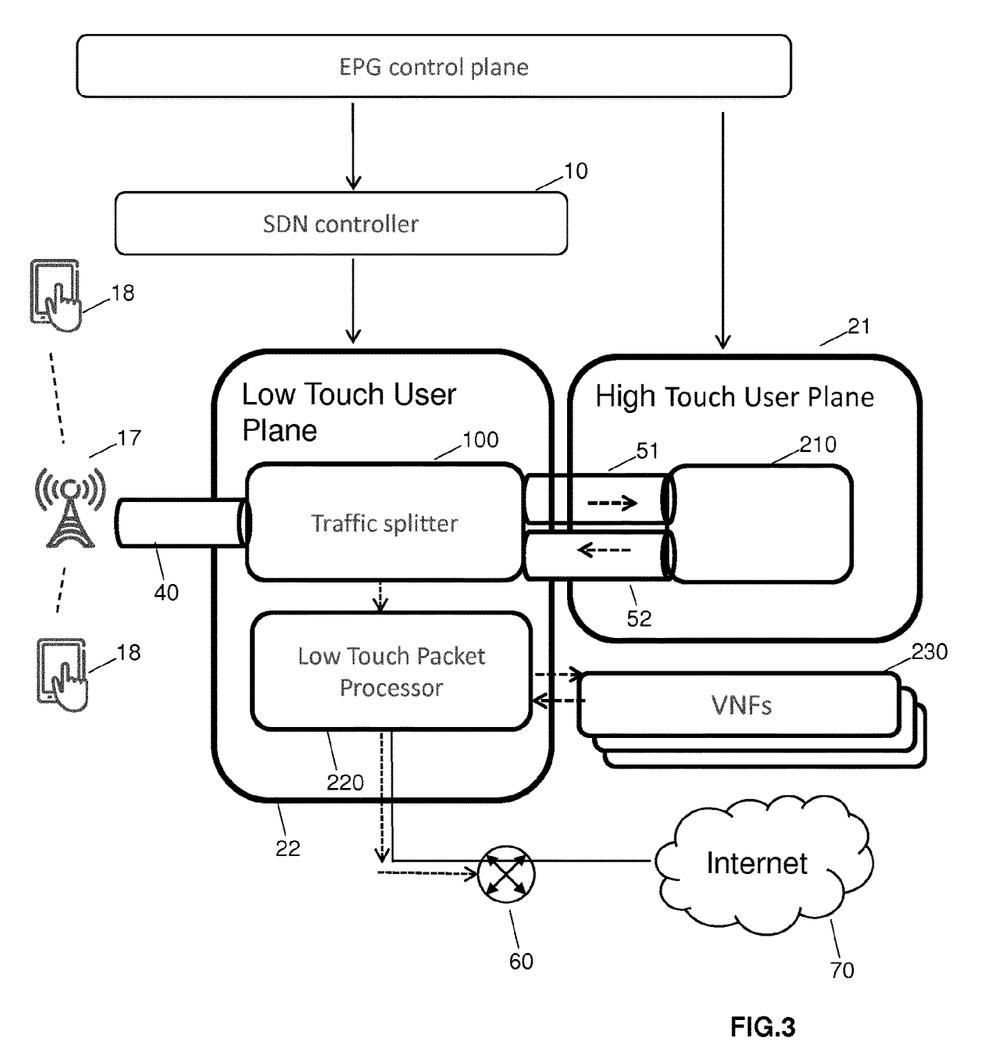
FIG. 3 shows a more detailed schematic view of a system in which a traffic splitter which transmits the traffic either through the SDN processing path or the EPC processing path is provided.

Now referring to FIG. 3 the traffic splitter 100 is introduced into the user plane, wherein the traffic splitter may be a software of hardware forwarding device as described above. The traffic splitter 100 is capable of opening up GTP (GPRS Tunneling Protocol) tunnels between radio nodes and core nodes, wherein the radio node could be the eNodeB, and the core node could be an Evolved Packet Gateway, EPG, or a Serving Gateway, SGW. Flows in the tunnels thus become accessible to examination by flow rules that are used to match on fields in the packet and decide whether to subject the packet to the EPC processing path 150 or the SDN processing path 140. One possibility to distinguish between the EPC and SDN processing path is to use a matching on data fields provided in the packet header of the data packet flows, such as the source IP address, the destination IP address, the protocol type, the source port number and the destination port number.

When it is decided that a packet data flow should use the SDN processing path or a low-touch treatment, the packets of these flows are handled in the SDN user plane 22, e.g. by a Network Function Virtualization Infrastructure, NFVI. The processing in the SDN processing path may be implemented in a virtual software switch and the processing function can include functions such as forwarding based on the destination IP address or MAC address.

As shown in FIG. 3, this processing may be implemented by a packet processor 220. In addition to this data manipulation with low complexity, additional services may be applied to the data packet flow. If further services should be applied to a data packet flow, the packets may be transmitted to virtual network functions (VNFs) 230 shown in FIG. 3. Additionally, a chain of these different service functions may be provided, named Service Function Chaining, SFC. In such a service function chaining the data packets of the flow are sent through the additional virtual network functions 230 or appliances that do not have to be on the shortest path to the destination address of the data packet flow. The functions 230 allow adding standardized packet processing functions that cannot be implemented by the traffic splitter or packet processor 220, but that also do not require the highly specialized and expensive functions of the EPC processing path in the EPC user plane. One example of a virtual network function 230 is a Network Address Translation, NAT, or Carriergrade Network Address Translation, CGNAT. These functions are sometimes needed even for simple applications, such as an access to the Internet, but cannot be implemented in the SDN controlled data planes due to the complexity of the function and the amount of state that needs to be maintained.

The data packet flows for which the traffic splitter 100 has decided that the EPC processing path should be followed are treated as follows: The data packets received via a tunnel 40 are investigated by the traffic splitter and based on the information in the packets the data splitter decides that the EPC user plane processing is necessary, a new GTP header is written into those packets. This additional GTP segment is introduced and is presently not used in 3GPP compliant networks. A GTP tunnel ID, TEID, for the additional segment can be the same as the one received from the radio network. However, it is also possible that the GTP tunnel ID is different from the one received from the radio network. Whether the same TEID or a different one is used can depend on implementation needs of the packet core virtual network function. The destination IP address of the newly encapsulated packet is rewritten to address the evolved packet core user plane network function. The packet is then forwarded to the evolved packet core user plane node 210 shown in FIG. 3. A further tunnel segment 52 is created to transport the traffic from the evolved packet core user plane function back to the low-touch forwarding instance in the infrastructure. The tunnel identifiers and end point IP addresses are programmed by the SDN controller 10 in an SDN control plane based on signaling messages received from an evolved packet core control plane. To this end, a signaling interface is provided between the SDN controller and the evolved packet core control plane not shown in FIG. 3.

The uplink traffic from the radio access network to the traffic splitter was discussed above. As far as a downlink traffic is concerned, which relates to a traffic which has passed the SDN processing path, this traffic is received from the Internet 70 via a router 60. The packet is then sent through exactly the same series of hops as the uplink traffic. This includes either the high-touch or the low-touch data plane and any of the potential services applied by the virtual network functions 230. Furthermore, a tunnel towards the radio network is selected by the traffic splitter 100 and packets are forwarded to the radio access network through this tunnel 40.

Figure 4:
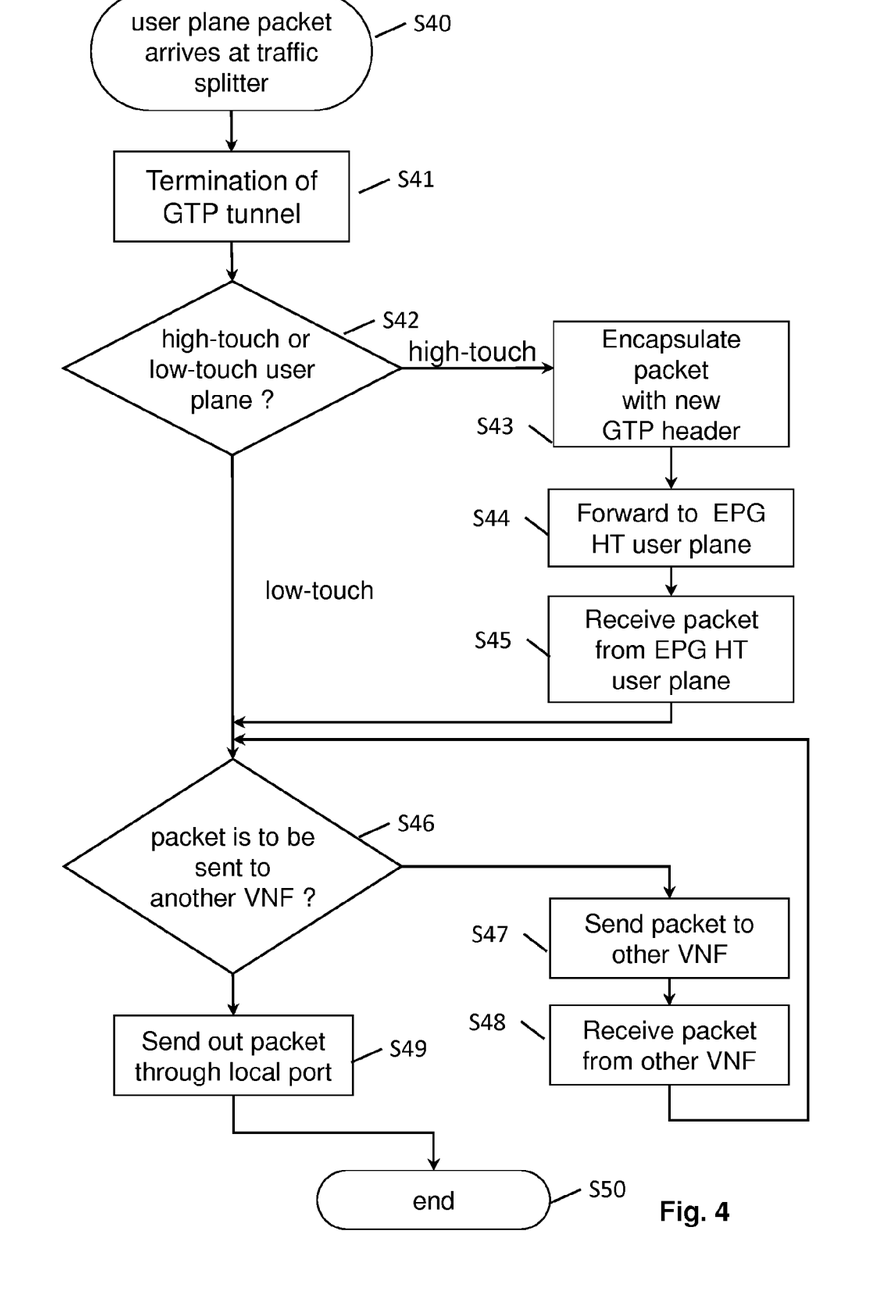
FIG. 4 shows a flowchart of a method carried out by the traffic splitter shown in FIG. 4 which controls the data packet flows in such a way that they are either passed through the SDN processing path or the EPC processing path.
Figure 5:
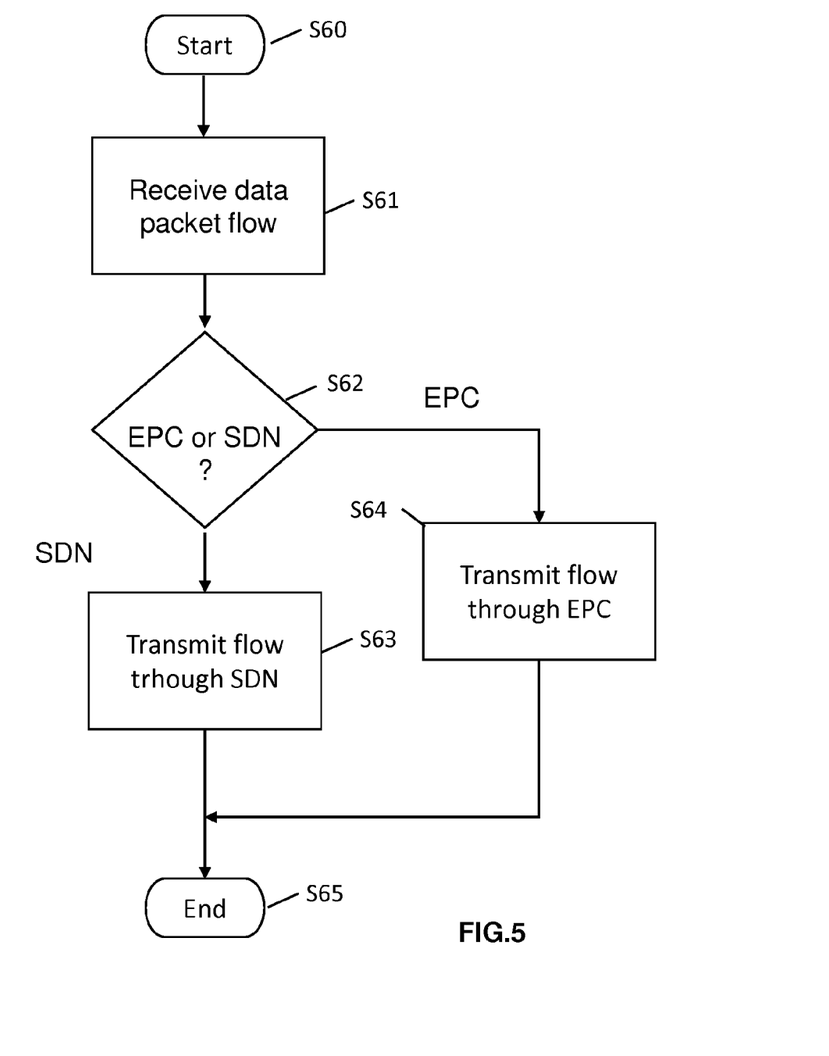
FIG. 5 shows a further example flowchart of a method carried out by the traffic splitter of FIG. 4 controlling the data packet flows through the data plane.

FIG. 4 summarizes the steps carried out by the traffic splitter. The data packet flow arrives at the splitter in step S40. In step S41 the GTP tunnel is terminated, meaning that inter alia the GTP header is removed from the data packets. In step S42 it is determined whether the data packet flow should be passed along the SDN processing path 140 or the EPC processing path 150. In this step a matching on the inner data packet, on the header, is carried out, and based on the information such as destination or source address or any other information provided in the 5-tuple of the packets it is decided whether the SDN processing path or EPC processing path is used. The traffic splitter can have a table which indicates based on the different pieces of information such as 5-tuple which processing path is used. The table, the flow table, is programmed by the SDN controller 10 When it is determined in step S42 that the EPC processing path 150 should be followed, the packets of the data packet flow are encapsulated with a new GTP header, either with a new tunnel ID or an existing tunnel ID. In step S44 the data packet flow is then forwarded to the EPG (Evolved Packet Gateway) user plane and forwarded to the final destination. It is possible that additional service functions should also be applied to the data packet flow passing through the EPC processing path. Accordingly, packets are received back in step S45 from the EPG user plane, so that it can be decided in step S46 whether a service should be applied by the virtual network function.

As far as the packets are concerned which should follow the less complex data manipulation, it is directly asked in step S46 whether a single or several services should be applied to the packets. If this is the case, in step S47 the packet is sent to one or several of the VNFs 230. After the data packet flow has passed the virtual network functions, it is received from one of the network functions in step S48. If it is determined in step S46 that all the network functions necessary have been applied, the packet can be sent out through a local port to the external router 60 and further to its final destination, e.g. the Internet 70.

Figure 6:
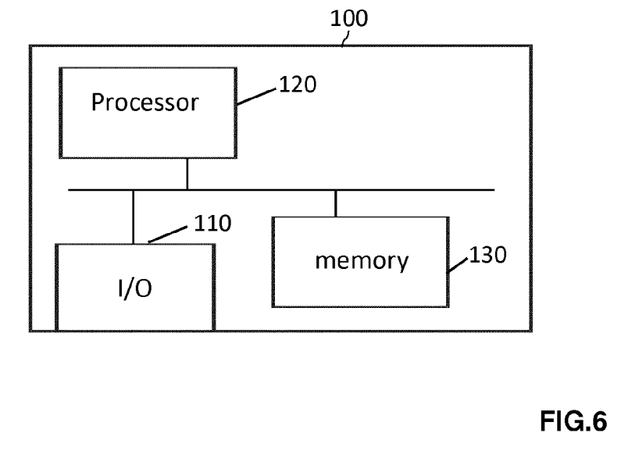
FIG. 6 shows an example schematic representation of a traffic splitter configured to control the data packet flows flowing through the data plane.

FIG. 6 summarizes some of the steps carried out in the traffic splitter 100. The method starts in step S60 and in step S61 a data packet flow is received, e.g. from the radio access network part via tunnel 40. In step S62 it is decided by the traffic splitter whether the EPC processing path or the SDN processing path should be applied to the data packet flow. As discussed above, information provided in the data packet itself may be used. When the data packet traffic is a downlink traffic, the packets are sent to exactly the same entities or nodes as the uplink traffic, but in the opposite direction. When a data packet is received by the traffic splitter from tunnel 51 of FIG. 3, the data packet is a downlink packet. When the data packet is received from tunnel 40, it is an uplink packet. When the EPC processing path 150 is selected in step S62, the data packet flow is transmitted through the EPC processing path in step S64 and when the SDN path should be applied, the flow is transmitted through the SDN processing path 140 in step S63. As mentioned above in connection with FIG. 4, additional processing steps may be added by the virtual network functions 230, but this is not necessarily the case. The method ends in step S65.

FIG. 6 shows a schematic view of the traffic splitter 100. The traffic splitter 100 comprises an interface 110 which represents the possibility to transmit and receive data packet flows, and to transmit and receive control messages, either from the SDN controller or from an EPG control plane. The traffic splitter 100 furthermore comprises a processor 120 which is responsible for the operation of the traffic splitter 100. The processor 120 can comprise one or more processing units and can carry out instructions stored on a memory 130, wherein the memory can include a read-only memory, a random access memory, a mass storage, a hard disk or the like. The memory can furthermore include a suitable program code to be executed by the processor 120 so as to implement the above-described functionalities in which the traffic splitter is involved.

The memory 130 can furthermore store flow tables programmed by the SDN controller which are used by the traffic splitter to decide how to forward data packets of a data packet flow based on the information provided in the header of the data packet.

Figure 7:
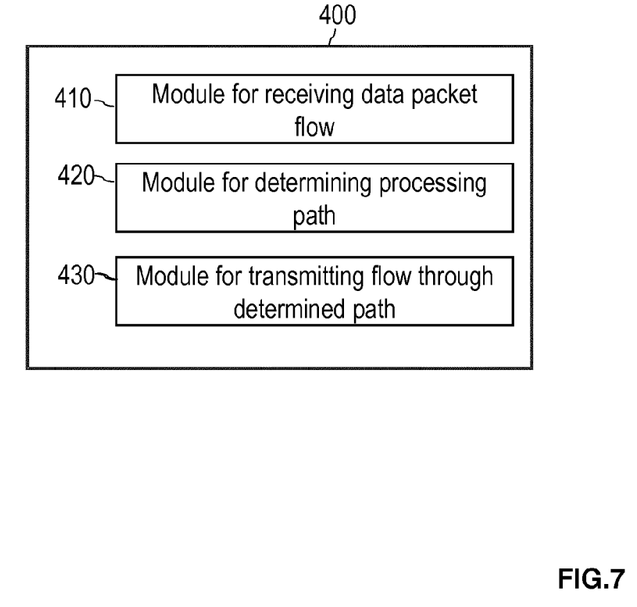
FIG. 7 shows another example schematic representation of a traffic splitter configured to control the data packet flows through the data plane.

FIG. 7 shows a further embodiment of the traffic splitter, the traffic splitter comprising a module 410 for receiving the data packet flow. Furthermore, a module 420 is provided for determining the processing path, especially for determining whether the SDN processing path 140 or the EPC processing path 150 should be applied. Furthermore, a module 430 is provided for transmitting the data packet flow through the determined path.

From the above disclosure some general conclusions can be drawn.

The data packet flow is transmitted to the SDN processing path 140 when a less complex data manipulation is carried out on the data packet flow compared to a data manipulation carried out on the data packet flow in the EPC processing path 150.

When a more complex data manipulation is carried out on the data packet flow compared to the processing occurring in the SDN processing path 140, the EPC processing path 150 may be used.

When the data packets are transmitted through the SDN processing path 140, the data packet flow is forwarded based on information present in the packet header of the data packets and based on information provided by the SDN controller 10. The SDN controller provides the information to which output port the data packet flow should be transmitted and this information may be stored in the traffic splitter in flow tables.

When the data packet flow is transmitted through the EPC processing path 150, the data packet flow is assigned to a core tunnel which is set up between the traffic splitter and a user plane network entity of the mobile communications network.

Furthermore, it is possible that a plurality of data packet flows are received from the radio access network part of the mobile communications network. Here it is determined for each flow of the plurality of data packet flows whether it should be transmitted through the EPC processing path 150. Furthermore, a core tunnel is identified to a user plane network entity, such as entity 210 shown in FIG. 3 and all the data packet flows that should be transmitted through the EPC processing path are transmitted as collected data packet flows through the core tunnel.

Furthermore, a tunnel identification is added to the data packets of the data packet flow transmitted through the core tunnel.

Furthermore, it is possible that the data packet flows are received through a radio tunnel extending from the radio access network to the traffic splitter.

Additionally, it may be determined whether a service should be applied to the received data packet flow by a service providing entity, such as the virtual network function 230 of FIG. 3 which is configured to provide services to the data packet flow. If this is the case, the received data packet flow is forwarded to the service providing entity based on information provided by the SDN controller 10 configured to control the SDN processing path 140. Here a plurality of services may be applied to one identified packet flow of the uplink traffic in a defined order. For the downlink traffic of the same data packet flow the same plurality of services can be applied to the identified data packet flow which is sent back in the downlink direction.

Furthermore, it is possible that a downlink data packet flow is received which has been transmitted through exactly the same series of entities of the network as the corresponding uplink data packet flow. Here it is determined to which tunnel connecting the traffic splitter 100 to the radio access network the received downlink data packet flow should be transmitted and the downlink data packet flow is forwarded through the determined tunnel.

For determining whether the EPC processing path or the SDN processing path should be applied, the 5-tuple present in the data packets of the data packet flow may be used. In addition, this determination may also be based on the identifier used in the tunnel in the uplink direction.

Furthermore, it is determined for each of the data packet flows to which subscriber of the mobile communications network the data packet flows belong.

Summarizing, the present application adds a traffic splitter to the data plane of the mobile data network where GTP tunnels are terminated between the radio access network and the packet core network. The traffic splitter 100 contains functions to identify individual flows from within each GTP tunnel. Furthermore, the traffic splitter 100 contains a functionality to forward packets to one or several data plane implementations. Additionally, the traffic splitter 100 has the functionality to create new or additional GTP tunnel segments to link a classic EPC data plane function or functions into the traffic flow. Furthermore, the SDN based data plane is added with a service function chaining capability which is provided for the data plane of a virtualized mobile core network. By adding the traffic splitter 100 and the corresponding SDN processing path 140, the traffic load is reduced on the EPC user plane and the corresponding gateways. The scalability of the system is enhanced especially in virtual packet gateway deployments. The cost is reduced by applying simple forwarding so that the packet forwarding may be delegated to the network infrastructure. This enables hardware acceleration to achieve even higher efficiency. The capacity of the CPU intensive packet processing functions of the evolved packet gateways is preserved for only those flows which require a more complex handling or processing.

The above-described mechanism helps to flexibly direct mobile data packet flows to the most suitable forwarding device. Flows requiring more complex processing such as deep packet inspection or complex policy enforcement can be continuously treated in complex virtual packet core user plane network functions which are often based on an x86 environment. High-bandwidth flows requiring only massive forwarding performance with little intelligence can be delegated to simple forwarding elements that may be accelerated in hardware. The application makes it possible to delegate GTP tunnel termination and forwarding from a virtual network function such as a virtual evolved packet gateway into the network virtualization infrastructure, for example virtual soft switches, acting as hypervisor switches to the virtual machines running on the virtual network functions. The forwarding operations of virtual soft switches can further be accelerated in hardware by so-called smart NICs (Network Interface Cards). As a result, the scalability of the virtual packet core is improved and the cost is reduced by using more efficient, hardware accelerated forwarding.

The invention claimed is:

1. A method for operating a traffic splitter provided for a data packet flow flowing through a data plane in a mobile communications network, the method comprising:
   receiving the data packet flow;
   determining whether the data packet flow should be transmitted through an Evolved Packet Core, EPC, processing path or through a Software Defined Network, SDN, processing path based on information provided in the data packets of the data packet flow; and
   transmitting the data packet flow either through the EPC processing path or the SDN processing path based on the determination.

2. The method of claim 1, wherein transmitting the data packet flow comprises, responsive to less complex data manipulation being carried out on the data packet flow in the SDN processing path compared to a data manipulation carried out on the data packet flows in the EPC processing path, transmitting the data packet flow through the SDN processing path.

3. The method of claim 1, wherein transmitting the data packet flow comprises, responsive to more complex data manipulation being carried out on the data packet flow in the EPC processing path compared to a data manipulation carried out on the data packet flows in the SDN processing path, transmitting the data packet flow through the EPC processing path.

4. The method of claim 1, wherein transmitting the data packet flow comprises transmitting the data packet flow through the SDN processing path by forwarding the data packet flow based on information present in a packet header of the data packets of the data packet flow and based on information provided by a SDN controller configured to control the SDN processing path.

5. The method of claim 1, wherein transmitting the data packet flow comprises:
   transmitting the data packet flow through the EPC processing path by assigning the data packet flow that should be transmitted through the EPC processing path to a core tunnel set up between the traffic splitter and a user plane network entity of the mobile communications network; and transmitting the assigned data packet flow through the core tunnel.

6. The method of claim 1, further comprising:

receiving a plurality of data packet flows from a radio access network part of the mobile communications network;

determining for each flow of the plurality of data packet flows, whether it should be transmitted through the EPC processing path;

identifying a core tunnel to a user plane network entity of the mobile communications network;

collecting all data packet flows that should be transmitted through the EPC processing path; and transmitting the collected data packet flows through the core tunnel.

7. The method of claim 5, wherein a tunnel identification is added to data packets of the data packet flow transmitted through the core tunnel.

8. The method of claim 6, wherein receiving the plurality of data packet flows comprises receiving the plurality of data packet flows through a radio tunnel extending from radio access network to the traffic splitter.

9. The method of claim 1, further comprising:

determining whether a service should be applied to the received data packet flow by a service providing entity configured to provide a service to the data packet flow; and responsive to determining that the service should be applied to the received data packet flow, forwarding the received data packet flow to the service providing entity based on information provided by a SDN controller configured to control the SDN processing path.

10. The method of claim 9, wherein a plurality of services are applied to one identified data packet flow of an uplink traffic in a defined order, and wherein the same plurality of services are applied to a downlink traffic of the one identified data packet flow.

11. The method of claim 1, further comprising:

receiving a downlink data packet flow in a downlink direction, the downlink data packet flow having been transmitted through exactly the same series of entities of the mobile communications network as a corresponding uplink data packet flow;

determining to which tunnel connecting the traffic splitter to the radio access network the received downlink data packet flow should be transmitted; and forwarding the downlink data packet flow through the determined tunnel.

12. The method of claim 1, wherein determining whether the data packet flow should be transmitted through the EPC processing path or through the SDN processing path is based on a 5 tuple present in the data packets of the data packet flow.

13. The method of claim 1, wherein receiving the data flow packet comprises receiving the data flow packet in a downflow direction, wherein determining whether the data packet flow received in the downlink direction should be transmitted through the EPC processing path or through the SDN processing path is based on a tunnel identifier used for a corresponding data flow received in the uplink direction.

14. The method of claim 1 further comprising:

determining to which subscriber of the mobile communications network the received data packet flow belongs.

15. A traffic splitter provided for a data packet flow flowing through a data plane in a mobile communications network, the traffic splitter comprising;

processing circuitry; and memory coupled to the processing circuitry and including instructions stored therein that are executable by the processing circuitry to cause the traffic splitter to perform operations, the operations comprising:

receiving the data packet flow, determining whether the data packet flow should be transmitted through an Evolved Packet Core, EPC, processing path or through a Software Defined Network, SDN, processing path based on information provided in the data packets of the data packet flow, and transmitting the data packet flow either through the EPC processing path or the SDN processing path based on the determination.

16. The traffic splitter of claim 15, wherein transmitting the data flow packet comprises, responsive to less complex data manipulation being carried out on the data packet flow in the SDN processing path compared to a data manipulation carried out on the data packet flows in the EPC processing path, transmitting the data packet flow through the SDN processing path.

17. The traffic splitter of claim 15, wherein transmitting the data packet flow comprises, responsive to more complex data manipulation being carried out on the data packet flow in the EPC processing path compared to a data manipulation carried out on the data packet flows in the SDN processing path, transmitting the data packet flow through the EPC processing path.

18. The traffic splitter of claim 15, wherein transmitting the data packet flow comprises transmitting the data flow path through the SDN processing path by forwarding the data packet flow based on information present in a packet header of the data packets of the data packet flow and based on information provided by a SDN controller configured to control the SDN processing path.

19. The traffic splitter of claim 15, wherein transmitting the data packet flow comprises:

transmitting the data packet flow through the EPC processing path and assigning the data packet flow that should be transmitted through the EPC processing path to a core tunnel set up between the traffic splitter and a user plane network entity of the mobile.

20. A non-transitory computer-readable medium having instructions stored therein that are executable by processing circuitry of a traffic splitter to cause the traffic splitter to perform operations, the operations comprising:

receiving the data packet flow;

determining whether the data packet flow should be transmitted through an Evolved Packet Core, EPC, processing path or through a Software Defined Network, SDN, processing path based on information provided in the data packets of the data packet flow; and transmitting the data packet flow either through the EPC processing path or the SDN processing path based on the determination.

* * * * *